United States Patent
Barrell et al.

(10) Patent No.: US 9,465,555 B2
(45) Date of Patent: Oct. 11, 2016

(54) METHOD AND APPARATUS FOR EFFICIENT PROCESSING OF DISPARATE DATA STORAGE COMMANDS

(71) Applicants: Michael David Barrell, Superior, CO (US); Zachary David Traut, Denver, CO (US)

(72) Inventors: Michael David Barrell, Superior, CO (US); Zachary David Traut, Denver, CO (US)

(73) Assignee: Seagate Technology LLC, Cupertino, CA (US)

( * ) Notice: Subject to any disclaimer, the term of this patent is extended or adjusted under 35 U.S.C. 154(b) by 477 days.

(21) Appl. No.: 13/964,162

(22) Filed: Aug. 12, 2013

(65) Prior Publication Data

US 2015/0046605 A1    Feb. 12, 2015

(51) Int. Cl.
  *G06F 3/00* (2006.01)
  *G06F 3/06* (2006.01)
  *G06F 11/07* (2006.01)

(52) U.S. Cl.
  CPC ............. *G06F 3/0659* (2013.01); *G06F 3/061* (2013.01); *G06F 3/0689* (2013.01); *G06F 3/0611* (2013.01); *G06F 11/0757* (2013.01)

(58) Field of Classification Search
  CPC . G06F 11/0757; G06F 6/0611; G06F 3/0611
  See application file for complete search history.

(56) References Cited

U.S. PATENT DOCUMENTS

| | | | |
|---|---|---|---|
| 5,381,528 A | 1/1995 | Brunelle | |
| 5,410,653 A | 4/1995 | Macon, Jr. et al. | |
| 5,522,054 A | 5/1996 | Gunlock et al. | |
| 5,557,767 A | 9/1996 | Sukegowa | |
| 5,600,817 A | 2/1997 | Macon, Jr. et al. | |
| 5,619,723 A | 4/1997 | Jones et al. | |
| 5,680,573 A | 10/1997 | Rubin et al. | |
| 5,687,389 A | 11/1997 | Packer | |
| 5,809,560 A | 9/1998 | Schneider | |
| 6,047,359 A | 4/2000 | Fouts | |
| 6,070,230 A | 5/2000 | Capps | |
| 6,092,141 A | 7/2000 | Lange | |
| 6,092,149 A | 7/2000 | Hicken et al. | |
| 6,195,727 B1 | 2/2001 | Islam et al. | |
| 6,226,713 B1 | 5/2001 | Mehotra | |
| 6,249,804 B1 | 6/2001 | Lam | |
| 6,286,080 B1 | 9/2001 | Galbraith et al. | |
| 6,321,300 B1 | 11/2001 | Ornes et al. | |
| 6,338,115 B1 | 1/2002 | Galbraith et al. | |
| 6,349,326 B1 | 2/2002 | Lam | |
| 6,505,268 B1 | 1/2003 | Schultz et al. | |
| 6,523,086 B1 | 2/2003 | Lee | |
| 6,549,977 B1 | 4/2003 | Horst et al. | |
| 6,567,892 B1 | 5/2003 | Horst et al. | |
| 6,701,413 B2 | 3/2004 | Shirai et al. | |

(Continued)

*Primary Examiner* — Zachary K Huson
(74) *Attorney, Agent, or Firm* — Thomas J. Lavan

(57) ABSTRACT

A method for improving I/O performance by a storage controller is provided. The method includes receiving a command completion from a storage device and checking for a command stored in a command queue for more than a predetermined time period. If a command has been in the command queue for more than the predetermined time period, then issuing the command and removing the command from the command queue. If no commands have been stored in the command queue for more than the predetermined time period, then determining if there are any uncompleted commands previously issued to the storage device. If there are not any uncompleted commands previously issued to the storage device, then processing a next command in the command queue and removing the next command from the command queue.

20 Claims, 12 Drawing Sheets

(56) References Cited

U.S. PATENT DOCUMENTS

| | | |
|---|---|---|
| 6,775,794 B1 | 8/2004 | Horst et al. |
| 6,789,171 B2 | 9/2004 | Desai et al. |
| 6,842,792 B2 | 1/2005 | Johnson et al. |
| 6,877,065 B2 | 4/2005 | Galbraith et al. |
| 6,910,099 B1 | 6/2005 | Wang et al. |
| 6,915,404 B1 | 7/2005 | Desai et al. |
| 6,931,486 B2 | 8/2005 | Cavallo et al. |
| 6,965,966 B1 | 11/2005 | Rothberg et al. |
| 7,069,354 B2 | 6/2006 | Pooni et al. |
| 7,120,753 B2 | 10/2006 | Accapadi et al. |
| 7,146,467 B2 | 12/2006 | Beardon et al. |
| 7,216,203 B1 | 5/2007 | Bagewadi |
| 7,302,530 B2 | 11/2007 | Barrick et al. |
| 7,318,142 B2 | 1/2008 | Accapadi et al. |
| 7,337,262 B2 | 2/2008 | Beeston et al. |
| 7,493,450 B2 | 2/2009 | Beardon |
| 7,523,259 B2 | 4/2009 | Pistoulet |
| 7,543,124 B1 | 6/2009 | Accapadi et al. |
| 7,724,568 B2 | 5/2010 | Arya et al. |
| 7,853,751 B2 | 12/2010 | Manoj |
| 7,996,623 B2 | 8/2011 | Walker |
| 8,074,020 B2 | 12/2011 | Seaman et al. |
| 8,356,126 B2 | 1/2013 | Ashmore |
| 2002/0069322 A1 | 6/2002 | Galbraith et al. |
| 2003/0041214 A1 | 2/2003 | Hirao et al. |
| 2003/0225977 A1 | 12/2003 | Desai et al. |
| 2004/0205298 A1 | 10/2004 | Beardon et al. |
| 2004/0205299 A1 | 10/2004 | Beardon |
| 2005/0021879 A1 | 1/2005 | Douglas |
| 2005/0060495 A1 | 3/2005 | Pistoulet |
| 2005/0235108 A1 | 10/2005 | Hiratsuka |
| 2005/0235125 A1 | 10/2005 | Accapadi et al. |
| 2006/0020759 A1 | 1/2006 | Barrick et al. |
| 2006/0248278 A1 | 11/2006 | Beeston et al. |
| 2006/0248387 A1 | 11/2006 | Nicholson et al. |
| 2006/0288186 A1 | 12/2006 | Accapadi et al. |
| 2007/0005904 A1 | 1/2007 | Lemoal et al. |
| 2007/0239747 A1 | 10/2007 | Pepper |
| 2007/0276993 A1 | 11/2007 | Hiratsuka |
| 2008/0005481 A1 | 1/2008 | Walker |
| 2009/0196143 A1* | 8/2009 | Haustein ............ G06F 3/0611 369/103 |
| 2009/0219760 A1 | 9/2009 | Arya et al. |
| 2010/0016283 A1 | 7/2010 | Alturi et al. |
| 2010/0208385 A1 | 8/2010 | Toukairin |
| 2011/0145508 A1 | 6/2011 | Pelleg et al. |
| 2012/0047548 A1 | 2/2012 | Rowlands et al. |
| 2012/0144123 A1 | 6/2012 | Aronovich et al. |

* cited by examiner

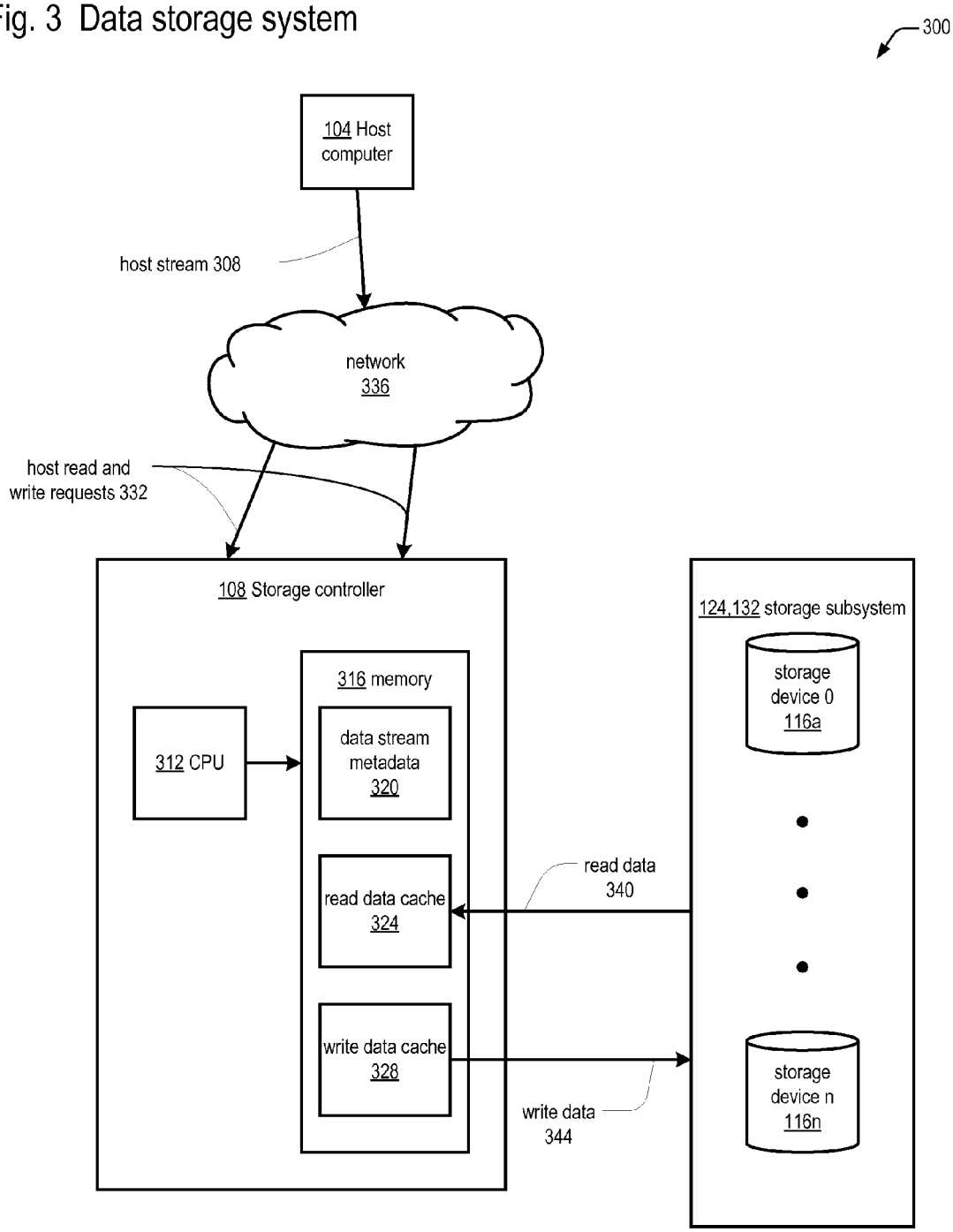
Fig. 3 Data storage system

Fig. 4 Storage device command queues
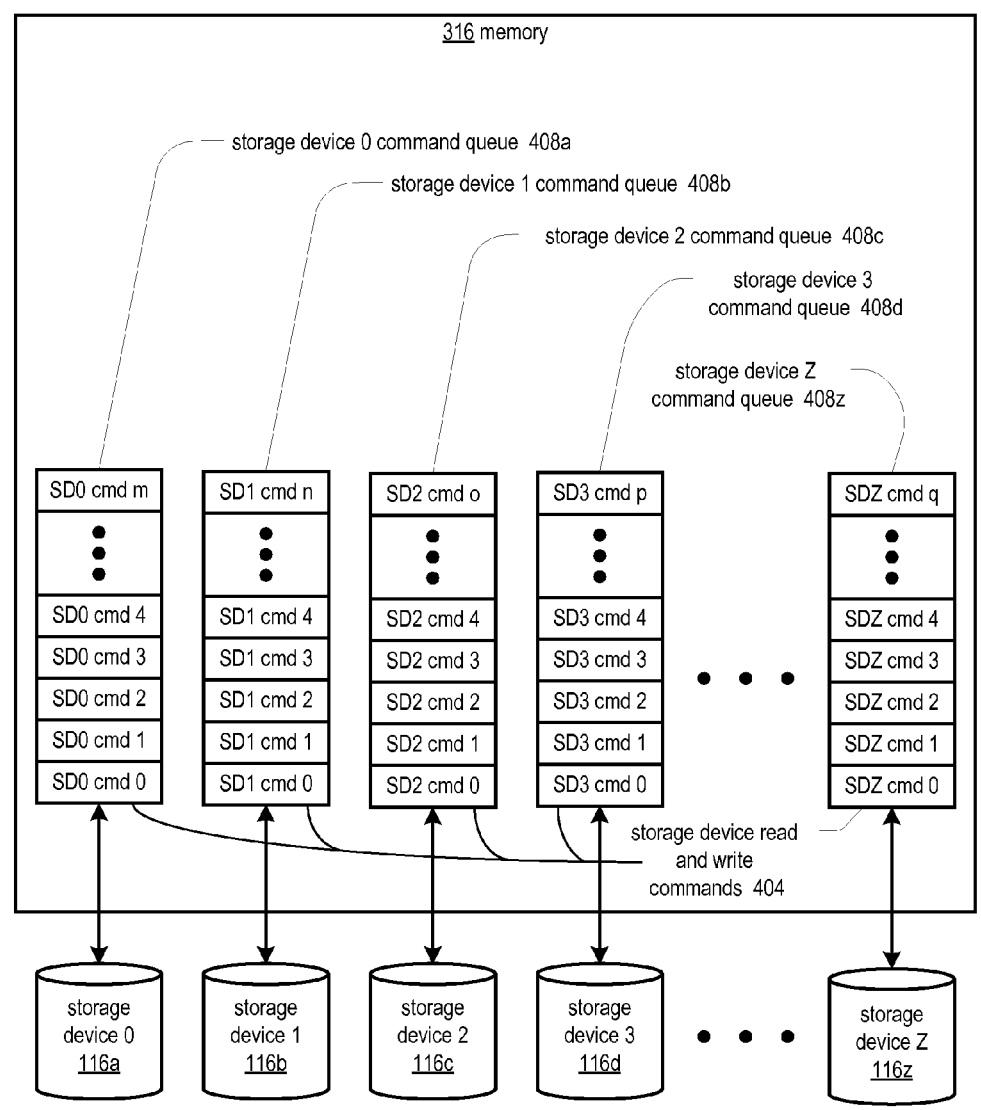

Fig. 5a  Storage device read and write commands
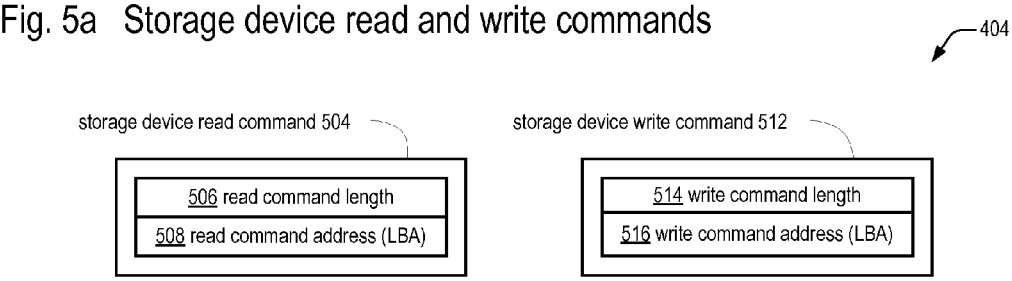
Fig. 5b  LBA and time-sorted queues
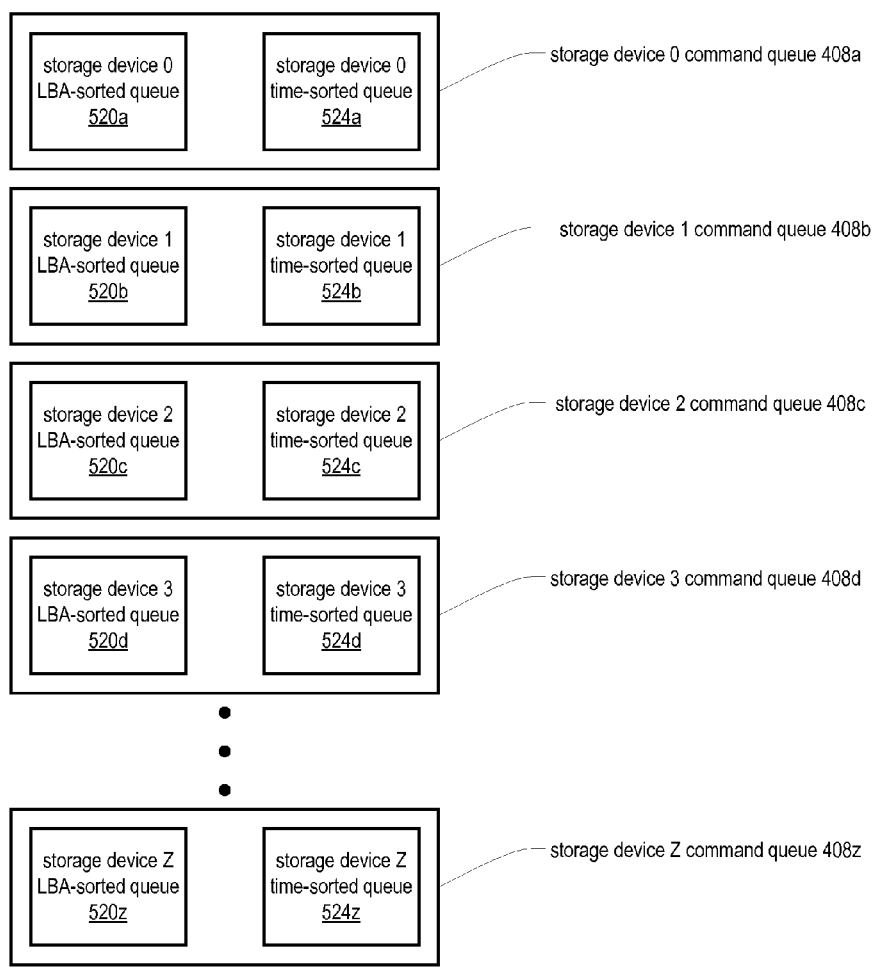

Fig. 6a Exemplary storage device command sequence
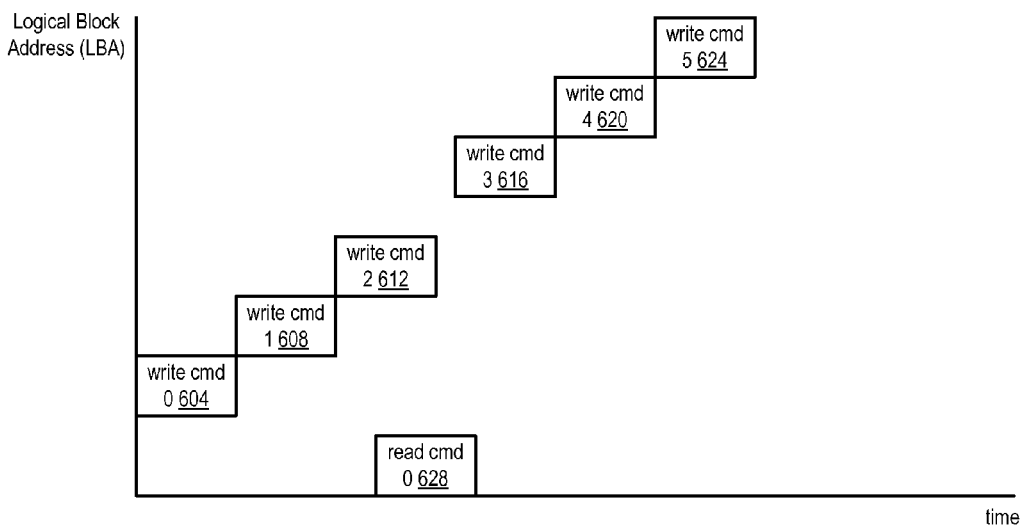
Fig. 6b Storage device command sequence sorted by time and LBA
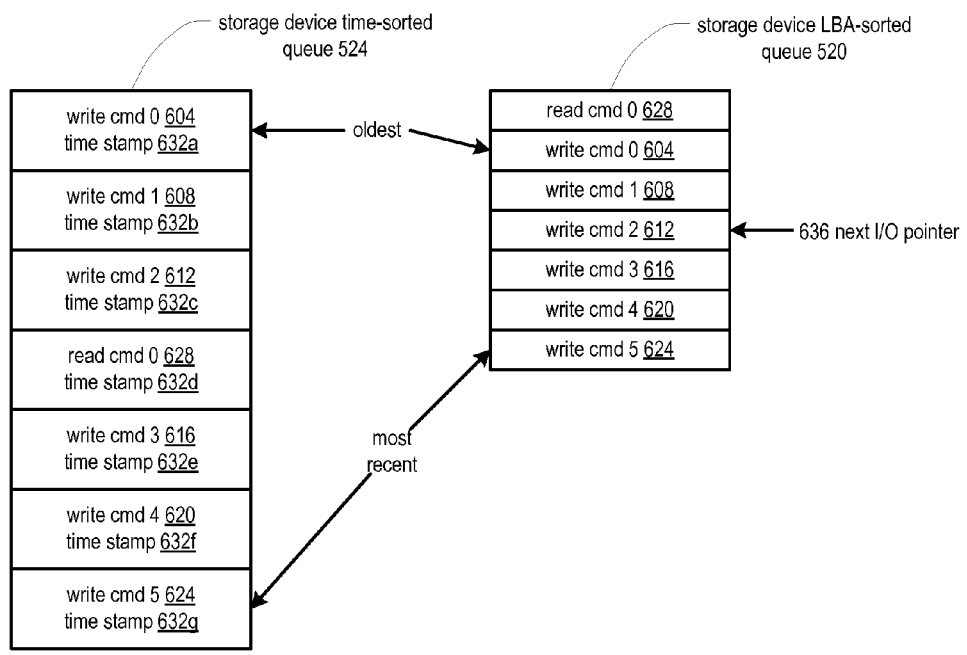

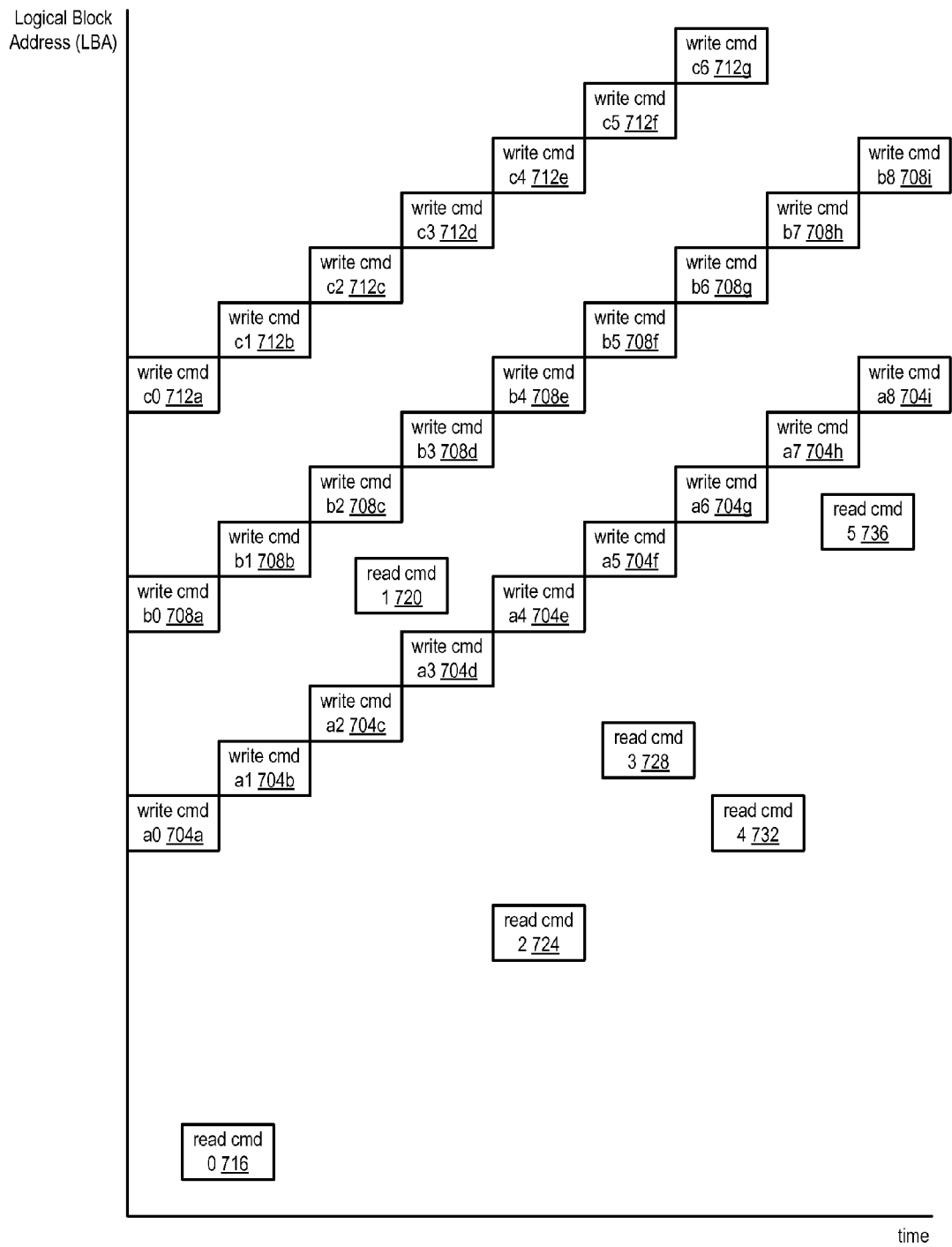
Fig. 7 Storage device multiple command streams

Fig. 8 New host read or write request update process
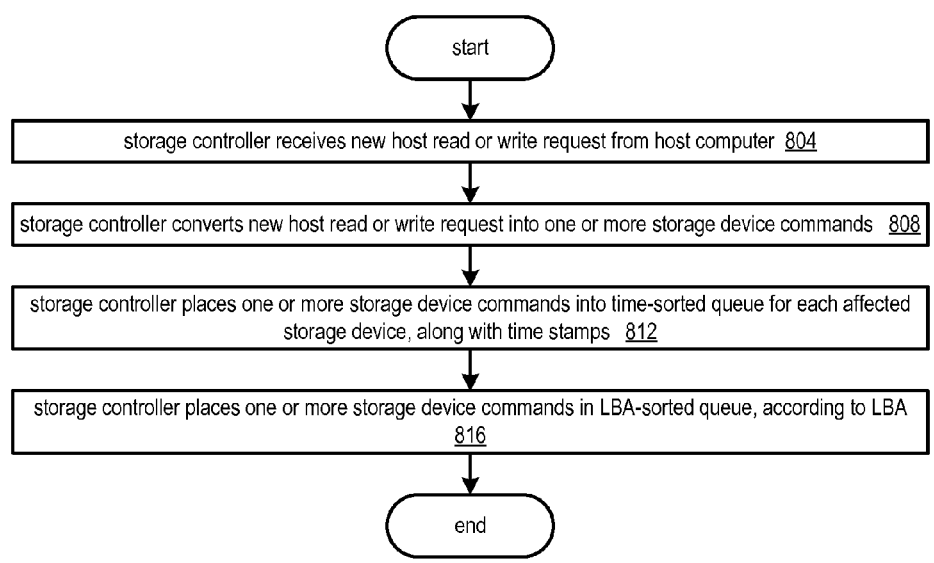

Fig. 9a First portion command issue process for single older command
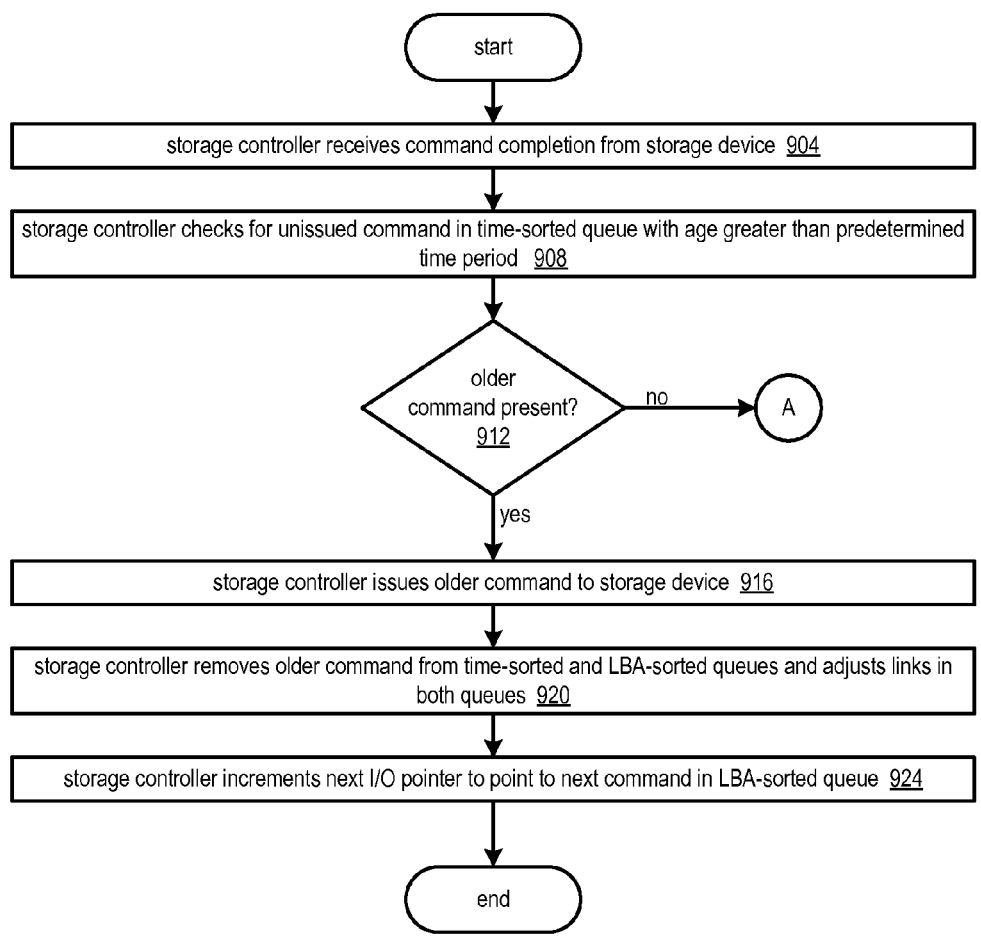

Fig. 9b Second portion command issue process for single older command
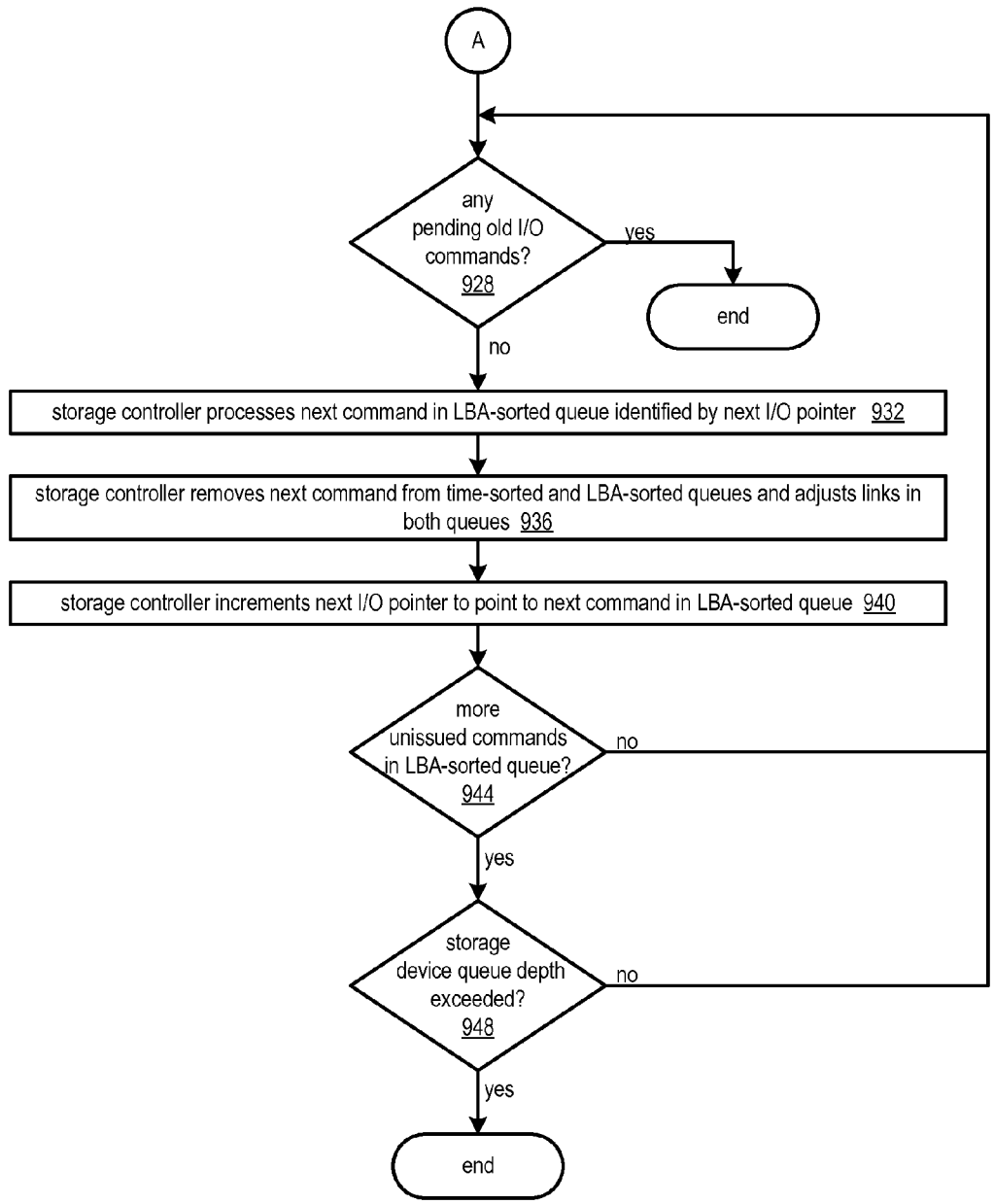

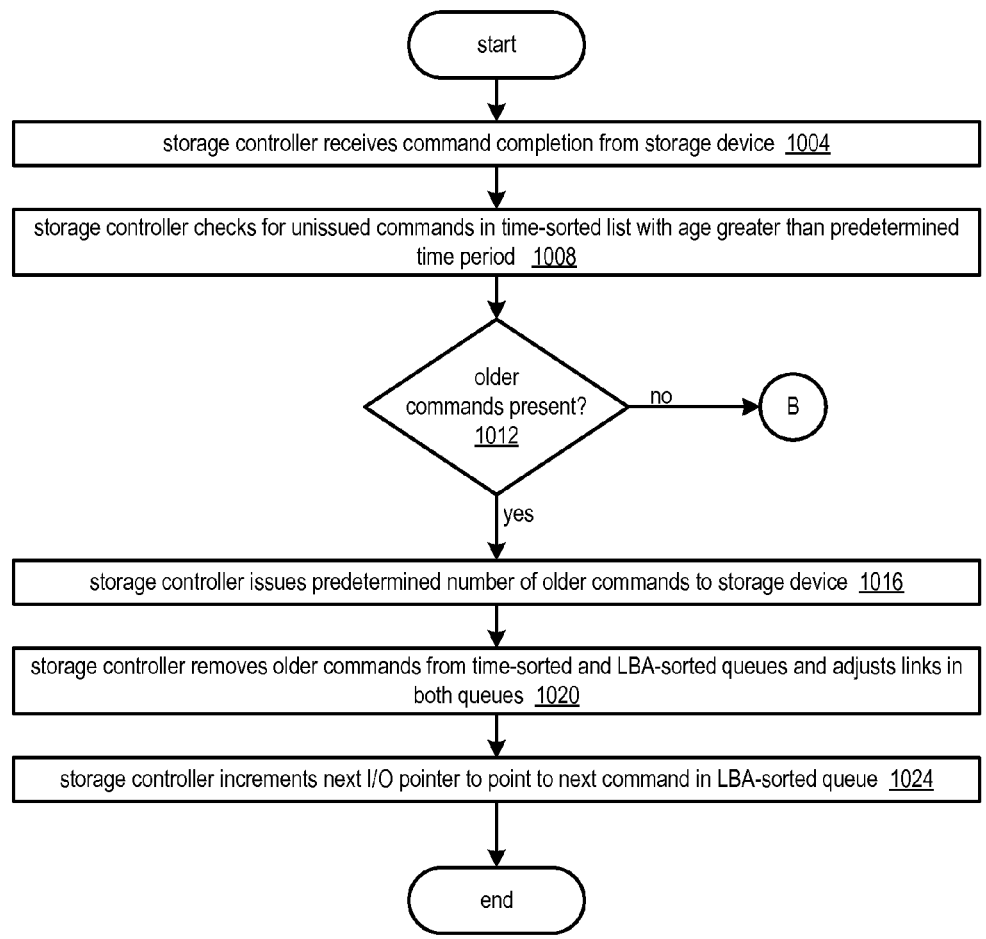
Fig. 10a First portion command issue process for multiple older commands

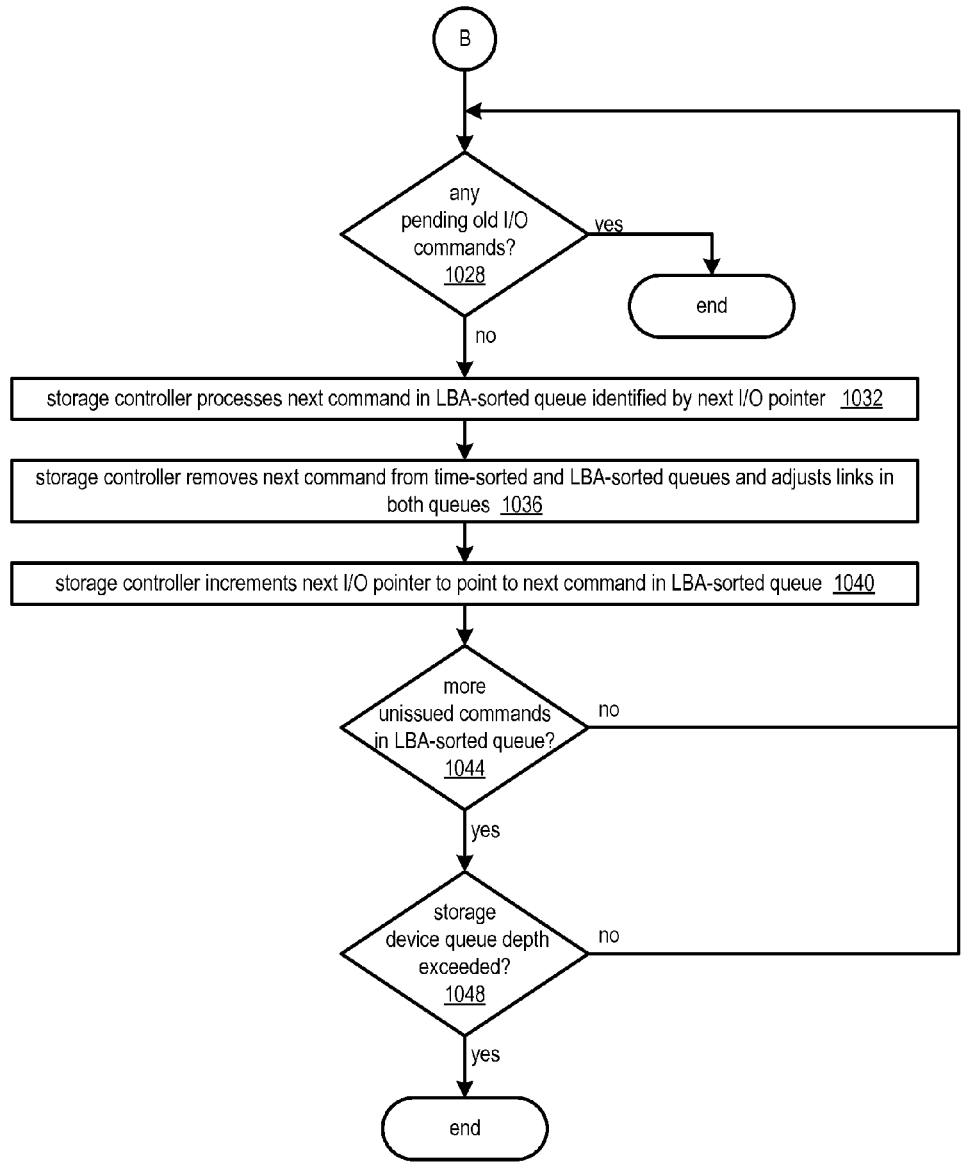
Fig. 10b Second portion command issue process for multiple older commands

METHOD AND APPARATUS FOR EFFICIENT PROCESSING OF DISPARATE DATA STORAGE COMMANDS

FIELD

The present invention is directed to computer data storage. In particular, the present invention is directed to methods and apparatuses for efficient processing of mixed sequential and non-sequential data storage commands by a storage controller.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into RAID or storage device read or write commands. Many storage controllers store read and write data in cache memories included as part of the storage controllers. In general, storage controllers are designed and intended to service both sequential and random read and write requests from one or more host computers. Sequential requests are generally sent to a storage controller as either a stream of read requests or a stream of write requests. Most of the time, the Logical Block Addresses of later-issued sequential requests are spatially adjacent to the immediately preceding sequential request, and a sequential stream is generally, but not necessarily, consistently increasing or decreasing in LBA.

Once processing a sequential stream, conventional storage controllers continue processing the stream until the controller detects the stream has ended. In this way, sequential read or write performance is maximized to the host computer issuing the sequential stream.

SUMMARY

The present invention is directed to solving disadvantages of the prior art. In accordance with embodiments of the present invention, a method for improving I/O performance by a storage controller is provided. The method includes receiving, by the storage controller, a command completion from a storage device coupled to the storage controller, where the storage controller includes a command queue, and checking, by the storage controller, for a command stored in the command queue for more than a predetermined time period. If a command has been in the command queue for more than the predetermined time period, then the method includes issuing to the storage device, by the storage controller, the command that has been stored in the command queue for more than the predetermined time period and removing, by the storage controller, the command from the command queue. If no commands have been stored in the command queue for more than the predetermined time period, then the method includes determining, by the storage controller, if there are any uncompleted commands previously issued to the storage device. If there are not any uncompleted commands previously issued to the storage device, then the method includes processing, by the storage controller, a next command in the command queue and removing, by the storage controller, the next command from the command queue.

In accordance with another embodiment of the present invention, a storage controller providing improved I/O performance is provided. The storage controller includes a processor and a memory, coupled to the processor. The memory includes a command queue. The processor receives a command completion from a storage device coupled to the storage controller, and checks for a command stored in the command queue for more than a predetermined time period. If a command has been stored in the command queue for more than the predetermined time period, the storage controller issues to the storage device the command that has been in the command queue for more than the predetermined time period and removes the command from the command queue. If no commands have been stored in the command queue for more than the predetermined time period, the processor determines if there are any uncompleted commands previously issued to the storage device. If there are not any uncompleted commands previously issued to the storage device, the processor processes a next command in the command queue and removes the next command from the command queue.

In accordance with yet another embodiment of the present invention, a storage system for providing improved I/O performance is provided. The storage system includes a storage device and a storage controller coupled to the storage device. The storage controller includes a processor and a memory, coupled to the processor. The memory includes a command queue, which includes a time-sorted queue and an LBA-sorted queue. The processor receives a command completion from the storage device and checks for a command stored in the command queue for more than a predetermined time period. If a command has been stored in the command queue for more than the predetermined time period, the storage controller issues to the storage device the command that has been in the command queue for more than the predetermined time period and the processor removes the command from the command queue. If no commands have been stored in the command queue for more than the predetermined time period, the processor determines if there are any uncompleted commands previously issued to the storage device. If there are not any uncompleted commands previously issued to the storage device, the processor processes a next command in the command queue and removes the next command from the command queue.

An advantage of the present invention is it provides a method to balance processing of sequential and random host data requests. When a storage device command completion is detected, the method looks for unissued commands in a storage controller command queue that have been present in the queue for more than a predetermined time period. This prevents a host application corresponding to unissued commands from being starved due to non-servicing or late servicing during execution of a large sequential stream by the storage controller.

Another advantage of the present invention is it provides for an expanding and contracting command queue for each storage device, according to the I/O commands issued to each storage device.

Yet another advantage of the present invention is it sorts all storage device commands in an LBA-sorted list as well as a time-sorted list. The two lists provide increased efficiency when processing sequential commands (LBA-sorted list), while making sure that unrelated commands (time-sorted list) do not get stalled.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4 is a block diagram illustrating storage device command queues in accordance with embodiments of the present invention.

FIG. 5a is a block diagram illustrating storage device read and write commands in accordance with embodiments of the present invention.

FIG. 5b is a block diagram illustrating Logical Block Address (LBA) and time-sorted queues in accordance with embodiments of the present invention.

FIG. 6a is a diagram illustrating an exemplary storage device command sequence in accordance with embodiments of the present invention.

FIG. 6b is a diagram illustrating a storage device command sequence sorted by time and LBA in accordance with the embodiments of the present invention.

FIG. 7 is a diagram illustrating storage device multiple command streams in accordance with embodiments of the present invention.

FIG. 8 is a flowchart illustrating a new host read or write request update process in accordance with embodiments of the present invention.

FIG. 9a is a flowchart illustrating a first portion of a command issue process for a single older command in accordance with embodiments of the present invention.

FIG. 9b is a flowchart illustrating a second portion of a command issue process for a single older command in accordance with the embodiments of the present invention.

FIG. 10a is a flowchart illustrating a first portion of a command issue process for multiple older commands in accordance with embodiments of the present invention.

FIG. 10b is a flowchart illustrating a second portion of a command issue process for multiple older commands in accordance with embodiments of the present invention.

DETAILED DESCRIPTION

The present invention is directed to improvements to storage device command issue in a storage controller in response to host computer read and write requests from multiple host computers. Each host computer generates independent read and write requests, based on operating system and host application execution. These read and write requests may be sequential, random, or a mix of sequential and random.

Storage controllers convert all received host read and write requests into storage device read and write commands, with a unique command queue maintained in storage controller memory for each storage device controlled by the storage controller. All unissued storage device read and write commands are stored in the command queues.

What is needed is an efficient way to process simultaneous and disparate storage device read and write commands, so that no host read and write requests are unserviced for an unacceptable period of time. For example, an unacceptable period of time may result in slow system performance, a host read or write request timing out and causing an application error, or other adverse operating system or application failure.

Figure 1A:
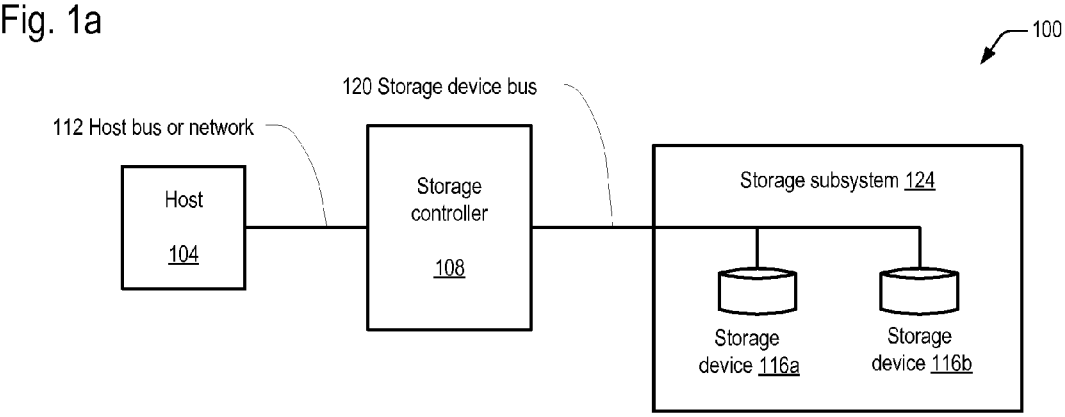
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
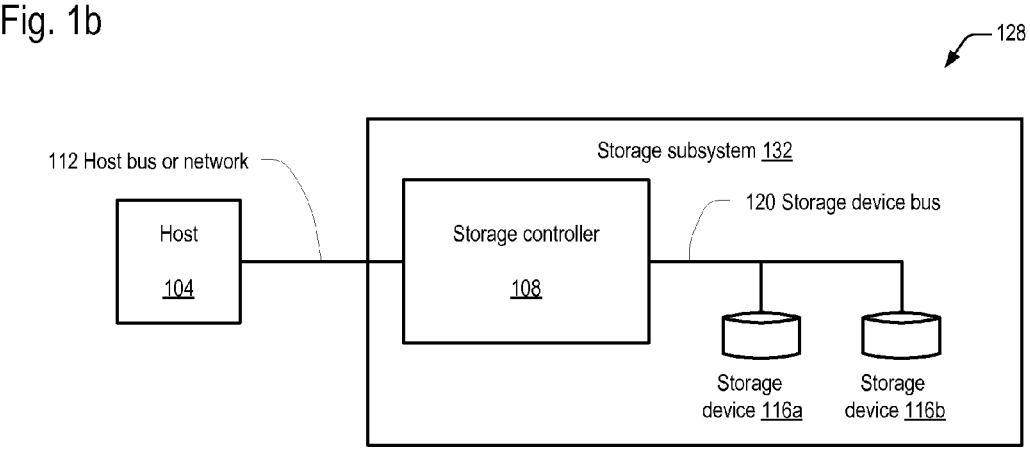
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
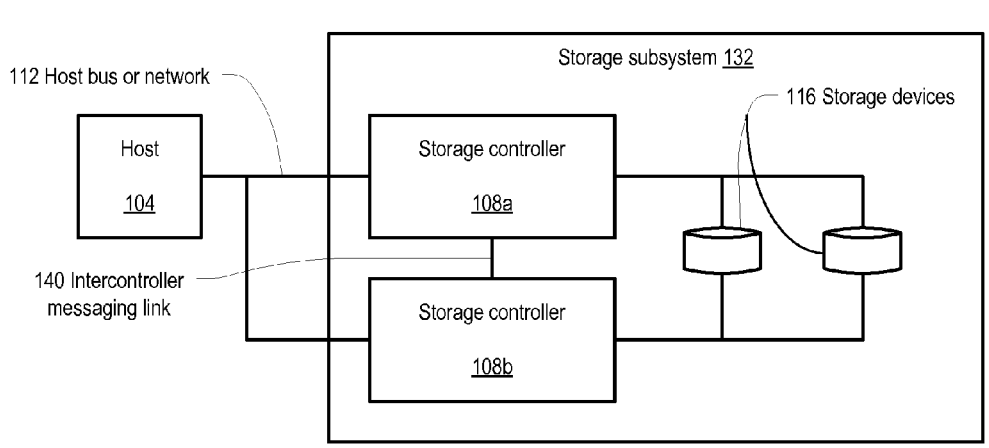
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
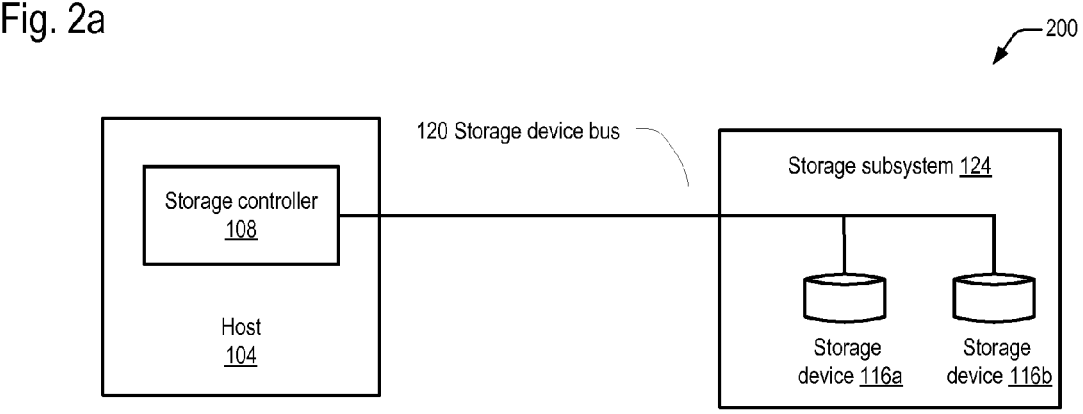
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
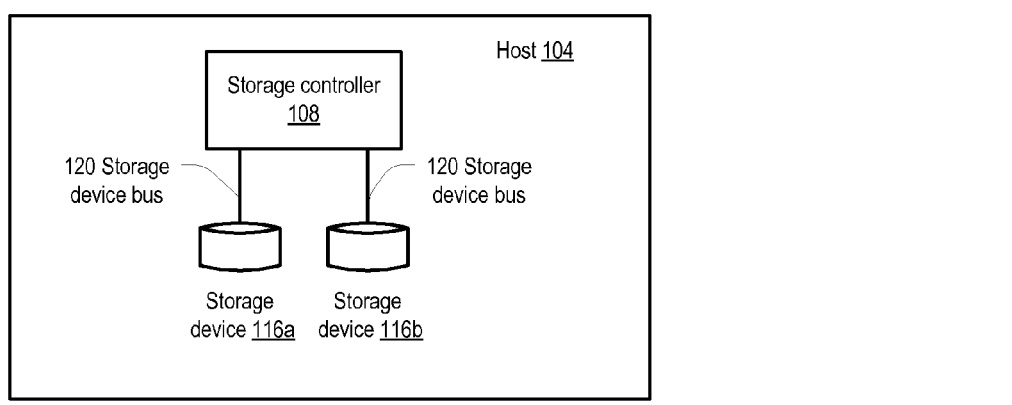
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
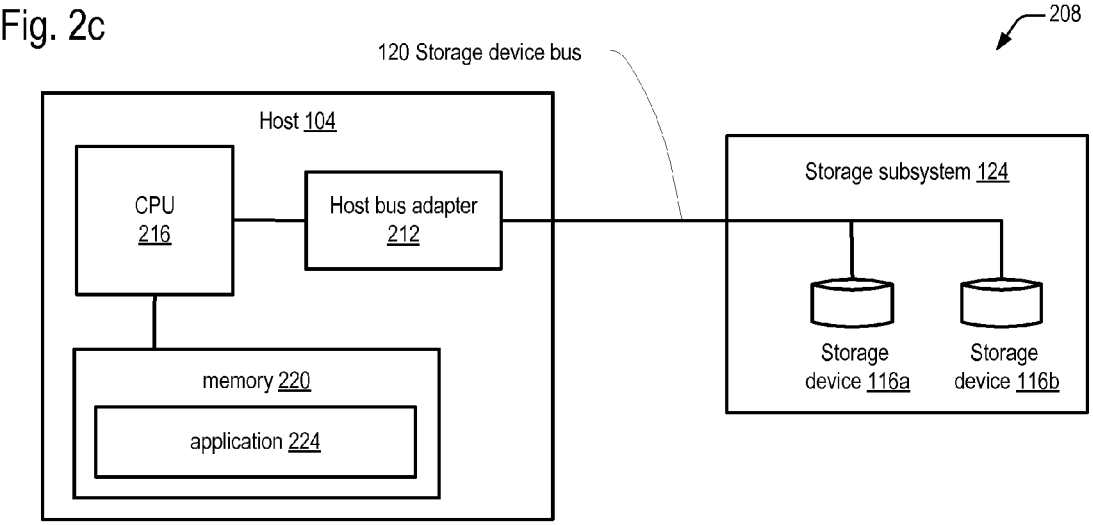
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 336. Host computer 104 generates one or more host streams 308, which includes one or multiple groups of host read and write requests 332.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324, also known as a read cache, and in some embodiments a write data cache 328, also known as a write cache, which provide improved read and write performance, respectively, to the host computer 104. Memory 316 also includes data stream metadata 320. Data stream metadata 320 stores parameters related to host read and write requests 332.

Storage controller 108 is coupled to storage subsystem 124, 132, which includes one or more storage devices 116a-116n. Read data 340 is read from storage devices 116 into the read data cache 324, where it can be provided in response to host read requests 332 much faster than directly from the storage devices 116. Write data 344 is provided to storage devices 116 from the write data cache 328.

It should be understood that storage controller 108 may be functionally organized in countless different functional organizations and architectures without diverting from the scope or operation of the present invention.

Referring now to FIG. 4, a block diagram illustrating storage device command queues 408 in accordance with embodiments of the present invention is shown. Storage controller 108 includes a storage device command queue 408 for each storage device 116 controlled by storage controller 108. In the embodiment illustrated in FIG. 4, there are z storage devices 116, identified as storage device 0 116a through storage device z 116z. Each of the z storage devices is coupled to one of z command queues 408 in storage controller memory 316, identified as storage device 0 command queue 408a through storage device Z command queue 408z. Each of the z command queues 408 provides storage device read and write commands 404 to the z storage devices 116.

Each storage device command queue 408 may contain the same or different number of storage device commands 404 as any other storage device command queue 408. For example, storage device 0 command queue 408a includes m storage device commands 404, identified as SD0 cmd 0 through SD0 cmd m. Storage device 1 command queue 408b includes n storage device commands 404, identified as SD1 cmd 0 through SD1 cmd n. Storage device 2 command queue 408c includes o storage device commands 404, identified as SD2 cmd 0 through SD2 cmd o. Storage device 3 command queue 408d includes p storage device commands 404, identified as SD3 cmd 0 through SD3 cmd p. Storage device Z command queue 408z includes q storage device commands 404, identified as SDZ cmd 0 through SDZ cmd q.

Referring now to FIG. 5a, a block diagram illustrating storage device read and write commands 404 in accordance with embodiments of the present invention is shown. Storage device read and write commands 404 includes storage device read commands 504 and storage device write commands 512. Each storage device read command 504 includes a read command length 506, typically in bytes of data, and a read command address 508, which is the Logical Block Address. Each storage device write command 512 includes a write command length 514, typically in bytes of data, and a write command address 516, which is the Logical Block Address.

Referring now to FIG. 5b, a block diagram illustrating Logical Block Address (LBA) 520 and time-sorted 524 queues in accordance with embodiments of the present invention is shown. Each storage device command queue 408 includes two different and independent queues. A storage device LBA-sorted queue 520 stores storage device read and write commands 404 directed to a corresponding storage device 116 in Logical Block Address (LBA) order. A storage device time-sorted queue 524 stores storage device read and write commands 404 directed to the corresponding storage device 116 in time order. Each entry in a storage device time-sorted queue 524 includes a time stamp indicating the time a storage device read or write command 404 is added to the storage device time-sorted queue 524.

At all times, there are the same number of storage device read and write commands 404 in a storage device LBA-sorted queue 520 and a storage device time-sorted queue 524 that are part of the same storage device command queue 408. New storage device read and write commands 404 are added to queues 520 and 524 at the same time, and newly issued storage device read and write commands 404 are removed from queues 520 and 524 at the same time.

Referring now to FIG. 6a, a diagram illustrating an exemplary storage device command 404 sequence in accordance with embodiments of the present invention is shown. A storage controller 108 received host read and write requests 332, and converts host read and write requests 332 into storage device read and write requests 404. In the example of FIG. 6a, a series of six sequential storage device write commands 404 are directed to a specific storage device 116. The six sequential storage device write commands 404 are identified as write cmd 0 604, write cmd 1 608, write cmd 2 612, write cmd 3 616, write cmd 4 620, and write cmd 5 624. The six sequential storage device write commands 404 are in a sequentially ascending sequence, where a temporally later storage device write command 404 is at a higher LBA than the temporally previous storage device write commands 404. After the storage controller 108 adds write cmd 2 612 to the storage device command queue 408, read command 0 628 is added to the storage device command queue 408.

Referring now to FIG. 6b, a diagram illustrating a storage device command 404 sequence sorted by time and LBA in accordance with the embodiments of the present invention is shown. FIG. 6b illustrates the storage device command 404 sequence illustrated in FIG. 6a.

Each storage device command 404 is present in a storage device time-sorted queue 524 and a storage device LBA-sorted queue 520. The storage device time-sorted queue 524 stores each command in the time order the command 404 is added to the storage device time-sorted queue 524. Therefore, read command 0 628 is stored between write command 2 612 and write command 3 616 since read command 0 628 is received into the storage device time-sorted queue 524 between the two write commands, as shown in FIG. 6a.

Each entry in the storage device time-sorted queue 524 includes a time stamp 632. Write command 0 604 is stored with time stamp 632a, reflecting the time that write command 0 604 is added to the storage device time-sorted queue 524. Write command 1 608 is stored with time stamp 632b, reflecting the time that write command 1 608 is added to the storage device time-sorted queue 524. Write command 2 612 is stored with time stamp 632c, reflecting the time that write command 2 612 is added to the storage device time-sorted queue 524. Read command 0 628 is stored with time stamp 632d, reflecting the time that read command 0 628 is added to the storage device time-sorted queue 524. Write command 3 616 is stored with time stamp 632e, reflecting the time that write command 3 616 is added to the storage device time-sorted queue 524. Write command 4 620 is stored with time stamp 632f, reflecting the time that write command 4 620 is added to the storage device time-sorted queue 524. Finally, write command 5 624 is stored with time stamp 632g, reflecting the time that write command 5 624 is added to the storage device time-sorted queue 524. At all times, the oldest storage device command 404 in the storage device time-sorted queue 524 is at one end of the storage device time-sorted queue 524, and the newest storage device command 404 in the storage device time-sorted queue 524 is at opposite end of the storage device time-sorted queue 524.

Storage device commands 404 are stored in the storage device LBA-sorted queue 520 in LBA 508, 516 order. As shown in FIG. 6a, read command 0 628 has a lower LBA 508 and the LBA 516 for any and all of the write commands 604, 608, 612, 616, 620, and 624. Therefore, read command 0 628 is at one end of the storage device LBA-sorted queue 520. The storage device command 404 at the opposite end of the storage-device LBA-sorted queue 520 is write command 5 624, since it has the highest LBA of all of the storage device commands 404. Therefore, in the example of FIG. 6a, the oldest command, write command 0 604, is not at one end of the storage device LBA-sorted queue 520, although write command 5 624 is at the opposite end of the storage device LBA-sorted queue 520. A next I/O pointer 636 identifies the entry in the storage device LBA-sorted queue 520 with the next highest LBA 508, 516. The processes of FIGS. 9a, 9b, 10a, and 10b utilize the next I/O pointer 636 when selecting a next storage device read or write command 404.

Referring now to FIG. 7, a diagram illustrating storage device multiple command streams in accordance with embodiments of the present invention is shown. Three storage device command streams are shown, identified as storage device write streams a, b, and c.

Storage device write stream a includes nine storage device write commands 404, identified as write command a0 704a through write command a8 704i. Storage device write stream b includes nine storage device write commands 404, identified as write command b0 708a through write command b8 708i. Storage device write stream c includes seven storage device write commands 404, identified as write command c0 712a through write command c6 712g.

In addition to the storage device write commands 404 of write streams a, b, and c, six read commands 404 are interspersed temporally and with varying LBAs 508. For example, read command 0 716 has a time stamp 632 between write commands a0 704a and a1 704b of write stream a, between write commands b0 708a and b1 708b of write stream b, and write commands c0 712a and c1 712b of write stream c. However, read command 0 716 has the lowest LBA 508 of all storage device commands 404 shown in FIG. 7.

Read command 1 720 has a time stamp 632 between write commands a2 704c and a3 704d of write stream a, between write commands b2 708c and b3 708d of write stream b, and write commands c2 712c and c3 712d of write stream c. However, read command 1 720 has an LBA 508 between write command b0 708a and write command b1 708b, and between write command a4 704e and write command a5 704f.

Read command 2 724 has a time stamp 632 equal to write command a4 704e of write stream a, write command b4 708e of write stream b, and write command c4 712e of write stream c. However, read command 2 724 has an LBA 508 between read command 0 716, and write commands a0 704a and read command 4 732.

Read command 3 728 has a time stamp 632 between write commands a5 704f and a6 704g of write stream a, between write commands b5 708f and b6 708g of write stream b, and write commands c5 712f and c6 712g of write stream c. However, read command 3 728 has an LBA 508 between write command a1 704b and write command a2 704c.

Read command 4 732 has a time stamp 632 between write commands a6 704g and a7 704h of write stream a, between write commands b6 708g and b7 708h of write stream b, and after write command c6 712g of write stream c. However, read command 4 732 has an LBA 508 equal to write command a0 704a.

Read command 5 736 has a time stamp 632 between write commands a7 704h and a8 704i of write stream a, and between write commands b7 708h and b8 708i of write stream b. However, read command 5 736 has an LBA 508 between write command b1 708b and write command b2 708c, and between write command a5 704f and write command a6 704g.

Referring now to FIG. 8, a flowchart illustrating a new host read or write request 332 update process in accordance with embodiments of the present invention is shown. Flow begins at block 804.

At block 804, the storage controller 108 receives a new host read or write request 332 from a host computer 104. Flow proceeds to block 808.

At block 808, the storage controller 108 converts new host read or write request 332 into one or more storage device read or write commands 404. In some embodiments, the storage controller 108 utilizes Redundant array of Inexpensive Disks (RAID) algorithms to determine which storage devices 116 receive storage device read or write commands 404, and which data and LBAs these commands should be directed to. In other embodiments, the storage controller 108 utilizes command coalescing processes to combine storage device read or write requests 404 directed to the same or closely spaced LBAs. Flow proceeds to block 812.

At block 812, the storage controller 108 places one or more storage device read or write commands 404 into one or more storage device time-sorted queues 524 and appends time stamps 632 to each new entry in a storage device time-sorted queue 524. The one or more storage device read or write commands 404 are the one or more storage device read or write commands 404 of block 808. Flow proceeds to block 816.

At block 816, the storage controller 108 places the one or more storage device read or write commands 404 of block 808 into one or more storage device LBA-sorted queues 520, according to LBA. The one or more storage device LBA-sorted queues 520 are individually included in the same storage device command queues 408 as the storage device time-sorted queues 524 of block 812. At this point, the storage device command queues 408 have been fully updated based on the new host read or write request 332 of block 804, and the asynchronous processes of FIGS. 9a, 9b, 10a, and 10b are free to operate on the storage device command queues 408 after receiving command completions from storage devices 116. Flow ends at block 816.

Referring now to FIG. 9a, a flowchart illustrating a first portion of a command issue process for a single older command 404 in accordance with embodiments of the present invention is shown. Flow begins at block 904.

At block 904, the storage controller 108 receives a command completion from a storage device 116. The command completion indicates to the storage controller 108 that a storage device read or write command 404 has been completed, and the completed storage device read or write command 404 has been removed from a command queue in the storage device 116. Flow proceeds to block 908.

At block 908, the storage controller 108 checks for an unissued command 404 in the time-sorted queue 524 with age greater than a predetermined time period. An unissued command is a command 404 in the time-sorted queue 524 that has not yet been sent to the storage device 116 as a storage device read or write command 404. The predetermined time period is based on the number of streams 308 the storage controller 108 is currently processing to a given storage device 116. In the preferred embodiment, the predetermined time period is 100 milliseconds (ms) X the number of host streams 308, with a maximum time period of 800 ms. Therefore, in the preferred embodiment the predetermined time period may increase or decrease based on the number of active streams 308. However, in other embodiments, a fixed predetermined time period may be used instead. Flow proceeds to decision block 912.

At decision block 912, the storage controller 108 determines if an older command 404 is present in the time-sorted queue 524. If there is an unissued command 404 in the time-sorted queue 524 with age greater than the predetermined time period, then flow proceeds to block 916. If there is not an unissued command 404 in the time-sorted queue 524 with age greater than the predetermined time period, then flow proceeds to decision block 928 of FIG. 9b.

At block 916, the storage controller 108 issues the older command 404 to the storage device 116. Flow proceeds to block 920.

At block 920, the storage controller 108 removes the older command 404 from both the time-sorted queue 524 and the LBA-sorted queue 520, and adjusts links in both queues 520, 524. In the preferred embodiment, queues 520 and 524 are linked lists, where each item in the list includes a pointer to the next item in the list. When an item in a linked list is removed from the linked list, the pointer of the immediately previous item in the list is modified to instead point to the item immediately following the removed item. Flow proceeds to block 924.

At block 924, the storage controller 108 increments the next I/O pointer 636 to point to the next command 404 in the LBA-sorted queue 520. This prepares the LBA-sorted queue 520 to issue the next command 404 in the list in an efficient manner. Flow ends at block 924, and the process waits until the storage controller 108 receives a new command completion from a storage device 116.

Referring now to FIG. 9b, a flowchart illustrating a second portion of a command issue process for a single older command 404 in accordance with embodiments of the present invention is shown. Flow begins at decision block 928, continuing from decision block 912 of FIG. 9a.

At decision block 928, the storage controller 108 determines if there are any pending old I/O commands. Pending old I/O commands are storage device read or write commands 404 that have been issued to the storage device 116 but have not yet completed. The storage controller 108 maintains for each storage device 116 a current count of pending old I/O commands. The count is incremented when a new storage device read or write command 404 is issued to a storage device 116, and the count is decremented when the storage controller 108 receives a command completion from the storage device 116. If there are any pending old I/O commands for the storage device 116, then flow ends at decision block 928. In this case, it is most efficient to wait until pending old I/O commands have completed before processing a next command 404 in the LBA-sorted queue 520. If there are not any pending old I/O commands to the storage device 116, then flow proceeds to block 932.

At block 932, the storage controller 108 processes the next command 404 in the LBA-sorted queue 520 identified by the next I/O pointer 636. There are not more pending old I/O commands to the storage device 116; therefore, continuing processing commands 404 in the LBA-sorted queue 520 is efficient. Flow proceeds to block 936.

At block 936, the storage controller 108 removes the next command 404 processed in block 932 from the time-sorted queue 524 and the LBA-sorted queue 520, and adjusts links in both queues 520, 524 as described with reference to block 920. Flow proceeds to block 940.

At block 940, the storage controller 108 increments the next I/O pointer 936 to point to the next command 404 in the LBA-sorted queue 520. This prepares the LBA-sorted queue 520 to issue the next command 404 in the list in an efficient manner. Flow proceeds to decision block 944.

At decision block 944, the storage controller 108 determines if there are more unissued commands 404 in the LBA-sorted queue 520. If there are more unissued commands 404 in the LBA-sorted queue 520, then flow proceeds to decision block 948 to check the storage device 116 queue depth. If there are not more unissued commands 404 in the LBA-sorted queue 520, then the storage controller 108 checks for any pending old I/O commands and proceeds to decision block 928.

At decision block 948, the storage controller 108 determines if the storage device 116 queue depth has been exceeded. The storage device 116 queue depth is the maximum number of storage device read or write commands 404 that the storage device 116 can simultaneously process. If the storage device 116 queue depth has been exceeded, then the storage device 116 can accept no more storage device read or write commands 404, the storage controller 108 must wait for a command completion, and flow ends at decision block 948. If the storage device 116 queue depth has not been exceeded, then flow proceeds to block 928 to check for any pending old I/O commands to the storage device 116.

It should be noted that the process of FIGS. 9a and 9b apply to a single time-sorted queue 524 and a single LBA-sorted queue 520 for a single storage device 116. Therefore, the processes of FIGS. 9a and 9b would be independently executed for each storage device 116 controlled by the storage controller 108.

Referring now to FIG. 10a, a flowchart illustrating a first portion of a command issue process for multiple older commands 404 in accordance with embodiments of the present invention is shown. Flow begins at block 1004.

At block 1004, the storage controller 108 receives a command completion from a storage device 116. The command completion indicates to the storage controller 108 that a storage device read or write command 404 has been completed, and the completed storage device read or write command 404 has been removed from a command queue in the storage device 116. Flow proceeds to block 1008.

At block 1008, the storage controller 108 checks for an unissued command 404 in the time-sorted queue 524 with age greater than a predetermined time period. An unissued command is a command 404 in the time-sorted queue 524 that has not yet been sent to the storage device 116 as a storage device read or write command 404. The predetermined time period is based on the number of streams 308 the storage controller 108 is currently processing to a given storage device 116. In the preferred embodiment, the predetermined time period is 100 milliseconds (ms) X the number of host streams 308, with a maximum time period of 800 ms. Therefore, in the preferred embodiment the predetermined time period may increase or decrease based on the number of active streams 308. However, in other embodiments, a fixed predetermined time period may be used instead. Flow proceeds to decision block 1012.

At decision block 1012, the storage controller 108 determines if an older command 404 is present in the time-sorted queue 524. If there is an unissued command 404 in the time-sorted queue 524 with age greater than the predetermined time period, then flow proceeds to block 1016. If there is not an unissued command 404 in the time-sorted queue 524 with age greater than the predetermined time period, then flow proceeds to decision block 1028 of FIG. 10b.

At block 1016, the storage controller 108 issues a predetermined number of older commands 404 to the storage device 116. The predetermined number of older commands 404 issued to the storage device 116 is selected in order to not exceed the storage device 116 queue depth. The count of pending old I/O commands discussed with reference to block 1028 cannot exceed the predetermined number of older commands 404 issued to the storage device 116. Flow proceeds to block 1020.

At block 1020, the storage controller 108 removes the older commands 404 from both the time-sorted queue 524 and the LBA-sorted queue 520, and adjusts links in both queues 404. In the preferred embodiment, queues 520 and 524 are linked lists, where each item in the list includes a pointed to the next item in the list. When an item in a linked list is removed from the linked list, the pointer of the immediately previous item in the list is modified to instead point to the item immediately following the removed item. Flow proceeds to block 1024.

At block 1024, the storage controller 108 increments the next I/O pointer 636 to point to the next command 404 in the LBA-sorted queue 520. This prepares the LBA-sorted queue 520 to issue the next command 404 in the list in an efficient manner. Flow ends at block 1024 to wait for a next command completion from the storage device 116.

Referring now to FIG. 10b, a flowchart illustrating a second portion of a command issue process for multiple older commands 404 in accordance with embodiments of the present invention is shown. Flow begins at decision block 1028, continuing from decision block 1012 of FIG. 10a.

At decision block 1028, the storage controller 108 determines if there are any pending old I/O commands. Pending old I/O commands are storage device read or write commands 404 that have been issued to the storage device 116 but have not yet completed. The storage controller 108 maintains for each storage device 116 a current count of pending old I/O commands. The count is incremented when a new storage device read or write command 404 is issued to a storage device 116, and the count is decremented when the storage controller 108 receives a command completion from the storage device 116. If there are any pending old I/O commands to the storage device 116, then flow ends at decision block 1028. In this case, it is most efficient to wait until pending old I/O commands have completed before processing a next command 404 in the LBA-sorted queue 520. If there are not any pending old I/O commands to the storage device, then flow proceeds to block 1032.

At block 1032, the storage controller 108 processes the next command 404 in the LBA-sorted queue 520 identified by the next I/O pointer 636. There are not more pending old I/O commands to the storage device; therefore, continuing processing commands 404 in the LBA-sorted queue 520 is efficient. Flow proceeds to block 1036.

At block 1036, the storage controller 108 removes the next command 404 processed in block 1032 from the time-sorted queue 524 and the LBA-sorted queue 520, and adjusts links in both queues 520, 524 as described with reference to block 1020. Flow proceeds to block 1040.

At block 1040, the storage controller 108 increments the next I/O pointer 936 to point to the next command 404 in the LBA-sorted queue 520. This prepares the LBA-sorted queue 520 to issue the next command 404 in the list in an efficient manner. Flow proceeds to decision block 1044.

At decision block 1044, the storage controller 108 determines if there are more unissued commands 404 in the LBA-sorted queue 520. If there are not more unissued commands 404 in the LBA-sorted queue 520, then flow proceeds to decision block 1028 to check for pending old I/O commands to the storage device 116. If there are more unissued commands 404 in the LBA-sorted queue 520, then the storage controller 108 checks the storage device 116 queue depth and flow proceeds to decision block 1048.

At decision block 1048, the storage controller 108 determines if the storage device 116 queue depth has been exceeded. The storage device 116 queue depth is the maximum number of storage device read or write commands 404 that the storage device 116 can simultaneously process. If the storage device 116 queue depth has been exceeded, then the storage device 116 can accept no more storage device read or write commands 404, the storage controller 108 must wait for a command completion, and flow ends at decision block 1048. If the storage device 116 queue depth has not been exceeded, then flow proceeds to block 1028 to check for any pending old I/O commands to the storage device 116.

It should be noted that the process of FIGS. 10a and 10b apply to a single time-sorted queue 524 and a single LBA-sorted queue 520 for a single storage device 116. Therefore, the processes of FIGS. 10a and 10b would be independently executed for each storage device 116 controlled by the storage controller 108.

Although the process steps of the present invention describe the storage controller 108 performing the actions, it is understood by one of ordinary skill in the art that a CPU or processor 312 generally performs these steps. However, in other embodiments, one or more processors, state machines, programmable logic devices, or other devices may perform these steps.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method, comprising:
   receiving, by a storage controller comprising a command queue, a command completion from a storage device coupled to the storage controller;
   in response to receiving the command completion, checking, by the storage controller, for a command stored in the command queue for more than a predetermined time period;
   if no commands have been stored in the command queue for more than the predetermined time period, then:
      determining, by the storage controller, if there are any uncompleted commands previously issued to the storage device;
      if there are not any uncompleted commands previously issued to the storage device, then:
         processing, by the storage controller, a next command in the command queue; and
         removing, by the storage controller, the next command from the command queue.

2. The method of claim 1, wherein prior to receiving the command completion from the storage device, the method further comprising:
   receiving, by the storage controller, one of a host read and a host write request from a host computer;
   converting, by the storage controller, the one of a host read and a host write request into one or more storage device commands; and
   placing, by the storage controller, the one or more storage device commands on the command queue.

3. The method of claim 1, wherein the command queue comprises a time-sorted queue and a LBA-sorted queue, wherein the time-sorted queue stores commands in time order, wherein each entry of the time-sorted queue comprises a command and a time stamp identifying when the command was added to the time-sorted queue, wherein the LBA-sorted queue stores commands in LBA-sorted order, wherein a pointer identifies the next command to be processed in the LBA-sorted queue.

4. The method of claim 3, wherein removing the command from the command queue comprises removing the command from the time-sorted queue and the LBA-sorted queue, wherein after removing, by the storage controller, the command from the command queue the method further comprising incrementing, by the storage controller, the pointer, wherein the storage controller is coupled to a plurality of storage devices, wherein the storage controller comprises a command queue for each storage device of the plurality of storage devices.

5. The method of claim 3, wherein processing the next command in the command queue comprises issuing the command in the LBA-sorted queue identified by the pointer to the storage device, wherein after removing, by the storage controller, the next command from the command queue, incrementing, by the storage controller, the pointer.

6. The method of claim 5, wherein after incrementing the pointer, the process further comprising:
   determining, by the storage controller, if there are any more unissued commands in the LBA-sorted queue;
   if there are not any more unissued commands in the LBA-sorted queue, then repeating determining if there are any uncompleted commands previously issued to the storage device; and
   if there are any more unissued commands in the LBA-sorted queue, then:
      checking, by the storage controller, if a storage device queue depth has been exceeded, wherein the storage device queue depth is a maximum number of commands the storage device can simultaneously process;
      if the storage device queue depth has not been exceeded, then repeating determining if there are any uncompleted commands previously issued to the storage device; and if the storage device queue depth has been exceeded, then waiting, by the storage controller, for a next command completion from the storage device.

7. The method of claim 3, wherein after receiving a command completion from the storage device:
determining, by the storage controller, that a plurality of commands have been stored in the command queue for more than the predetermined time period, and in response:
issuing to the storage device, by the storage controller, a predetermined number of commands that have been stored in the command queue for more than the predetermined time period; and
removing, by the storage controller, the commands corresponding to the predetermined number of commands from the command queue.

8. The method of claim 7, wherein the predetermined number of commands issued to the storage device is less than or equal to the plurality of commands stored in the command queue for more than the predetermined time period, wherein the predetermined time period corresponds to a number of host streams the storage controller is currently processing to a given storage device, wherein a host stream is a group of sequential host read or write requests from the same host computer.

9. The method of claim 1, wherein if a command has been in the command queue for more than the predetermined time period, then:
issuing to the storage device, by the storage controller, the command that has been stored in the command queue for more than the predetermined time period; and
removing, by the storage controller, the command from the command queue.

10. A storage controller, comprising:
a command queue comprising:
a time-sorted queue configured to store commands in time order; and
an LBA-sorted queue configured to store commands in LBA-sorted order,
the storage controller configured to receive a command completion from a storage device coupled to the storage controller, check for a command stored in the command queue for more than a predetermined time period, if a command has been stored in the command queue for more than the predetermined time period, the storage controller issues to the storage device the command that has been in the command queue for more than the predetermined time period and removes the command from the command queue, if no commands have been stored in the command queue for more than the predetermined time period, the storage controller determines if there are any uncompleted commands issued to the storage device, if there are not any uncompleted commands issued to the storage device, the storage controller processes a next command in the command queue and removes the next command from the command queue.

11. The storage controller of claim 10, wherein prior to receiving the command completion from the storage device, the storage controller receives one of a host read and write request from a host computer, wherein the storage controller converts the one of a host read and write request into one or more storage device commands and places the one or more commands on the command queue.

12. The storage controller of claim 10, wherein each entry of the time-sorted queue comprises a command and a time stamp identifying when the command was added to the time-sorted queue, wherein a pointer identifies the next command to be processed in the LBA-sorted queue.

13. The storage controller of claim 12, wherein the storage controller removes the command from the command queue comprises the storage controller removes the command from the time-sorted queue and the LBA-sorted queue, wherein after the storage controller removes the command from the time-sorted queue and the LBA-sorted queue, the storage controller increments the pointer.

14. The storage controller of claim 12, wherein the storage controller processes a next command in the command queue comprises the storage controller processes the command in the LBA-sorted queue identified by the pointer, wherein after the storage controller removes the next command from the command queue the storage controller increments the pointer.

15. The storage controller of claim 14, wherein after the storage controller increments the pointer, the storage controller determines if there are any more unissued commands in the LBA-sorted queue, wherein if there are not any more unissued commands in the LBA-sorted queue, the storage controller repeats determines if there are any more uncompleted commands previously issued to the storage device, wherein if there are any more unissued commands in the LBA-sorted queue, the storage controller checks if a storage device queue depth has been exceeded, wherein the storage device queue depth is a maximum number of commands the storage device can simultaneously process, wherein if the storage device queue depth has not been exceeded, the storage controller repeats determining if there are any uncompleted commands previously issued to the storage device, wherein if the storage device queue depth has been exceeded, the storage controller waits for a next command completion from the storage device.

16. The storage controller of claim 12, wherein after the storage controller receives a command completion from the storage device, the storage controller determines that a plurality of commands have been stored in the command queue for more than the predetermined time period, and in response issues to the storage device a predetermined number of commands that have been stored in the command queue for more than the predetermined time period and removes the commands corresponding to the predetermined number of commands from the command queue.

17. The storage controller of claim 16, wherein the predetermined number of commands issued to the storage device is less than or equal to the plurality of commands stored in the command queue for more than the predetermined time period.

18. The storage controller of claim 12, wherein the storage controller is coupled to a plurality of storage devices, wherein the storage controller comprises a command queue for each storage device of the plurality of storage devices.

19. A storage system, comprising:
a host computer, configured to provide host read and write requests;
a storage device; and
a storage controller, coupled to the storage device and the host computer, comprising:
a command queue,
wherein the storage controller receives the host read and write requests and converts the host read and write requests into storage device commands, wherein the storage controller receives a command completion from the storage device and in response checks for a storage device command stored in the command queue for more than a predetermined time period, wherein if a storage device command has been stored in the command queue for more than the predetermined time period, the storage controller issues to the storage device the storage device command that has been in the command queue for more than the predetermined time period and the storage controller removes the storage device command from the command queue, wherein if no storage device commands have been stored in the command queue for more than the predetermined time period, the storage controller determines if there are any uncompleted storage device commands previously issued to the storage device, wherein if there are not any uncompleted storage device commands previously issued to the storage device, the storage controller processes a next storage device command in the command queue and removes the next storage device command from the command queue.

20. The storage system of claim 19, wherein the storage controller is coupled to a plurality of storage devices, wherein the storage controller comprises a command queue for each storage device of the plurality of storage devices, wherein the storage controller manages each command queue independently from all other command queues.

* * * * *